United States Patent
Oikawa et al.

(10) Patent No.: US 10,487,244 B2
(45) Date of Patent: Nov. 26, 2019

(54) 2-CYANOACRYLATE COMPOSITION HAVING MAGNETISM

(71) Applicant: TOAGOSEI CO., LTD., Tokyo (JP)

(72) Inventors: Hiroshige Oikawa, Toyama (JP); Yushi Ando, Toyama (JP)

(73) Assignee: TOAGOSEI CO., LTD., Tokyo (JP)

( * ) Notice: Subject to any disclaimer, the term of this patent is extended or adjusted under 35 U.S.C. 154(b) by 311 days.

(21) Appl. No.: 15/518,719

(22) PCT Filed: Sep. 24, 2015

(86) PCT No.: PCT/JP2015/076942
§ 371 (c)(1),
(2) Date: Apr. 12, 2017

(87) PCT Pub. No.: WO2016/059952
PCT Pub. Date: Apr. 21, 2016

(65) Prior Publication Data
US 2017/0233614 A1    Aug. 17, 2017

(30) Foreign Application Priority Data
Oct. 15, 2014    (JP) .................... 2014-210656

(51) Int. Cl.
| | |
|---|---|
| *C09J 9/00* | (2006.01) |
| *C08K 3/08* | (2006.01) |
| *C08K 3/36* | (2006.01) |
| *C09J 11/04* | (2006.01) |
| *C08L 33/14* | (2006.01) |
| *H01F 1/28* | (2006.01) |
| *C09J 4/00* | (2006.01) |
| *H01F 1/03* | (2006.01) |
| *C08K 3/10* | (2018.01) |

(52) U.S. Cl.
CPC ............... *C09J 9/00* (2013.01); *C08K 3/08* (2013.01); *C08K 3/36* (2013.01); *C08L 33/14* (2013.01); *C09J 4/00* (2013.01); *C09J 11/04* (2013.01); *H01F 1/0306* (2013.01); *H01F 1/28* (2013.01); *C08K 3/10* (2013.01)

(58) Field of Classification Search
CPC ..... C09J 9/00; C09J 4/00; C09J 11/04; C08K 3/08; C08K 3/36; H01F 1/0306; H01F 1/28
See application file for complete search history.

(56) References Cited

U.S. PATENT DOCUMENTS

| | | | |
|---|---|---|---|
| 4,386,193 A | 5/1983 | Reich et al. | |
| 4,424,327 A | 1/1984 | Reich et al. | |
| 2005/0274454 A1* | 12/2005 | Extrand ............... | C09J 5/00 156/272.4 |
| 2014/0329959 A1 | 11/2014 | Barnes et al. | |

FOREIGN PATENT DOCUMENTS

| | | |
|---|---|---|
| JP | S47-12860 B1 | 4/1972 |
| JP | S55-2236 B2 | 1/1980 |
| JP | S58-215476 A | 12/1983 |
| JP | S59-91165 A | 5/1984 |
| JP | 60-110774 | * 6/1985 |
| JP | S60-110774 A | 6/1985 |
| JP | S60-37836 B2 | 8/1985 |
| JP | S60-168775 A | 9/1985 |
| JP | S60-179482 A | 9/1985 |
| JP | 61-155482 | * 7/1986 |
| JP | S61-155482 A | 7/1986 |
| JP | S62-235379 A | 10/1987 |
| JP | S63-88152 A | 4/1988 |
| JP | S63-128088 A | 5/1988 |
| JP | S63-137979 A | 6/1988 |
| JP | H01-43790 B2 | 9/1989 |
| JP | H01-272102 A | 10/1989 |
| JP | H01-289883 A | 11/1989 |
| JP | H2-28275 A | 1/1990 |
| JP | H2-142875 A | 5/1990 |
| JP | H03-167279 A | 7/1991 |
| JP | H08-120234 A | 5/1996 |
| JP | H08-124421 A | 5/1996 |
| WO | 85/01055 A | 3/1985 |
| WO | 95/20609 A | 8/1995 |
| WO | 2013/111036 A1 | 8/2013 |

OTHER PUBLICATIONS

Wang et al, "Magnetic Retraction of Bowel by Intraluminal Injectable Cyanoacrylate-Based Magnetic Glue", BioMed Research International, vol. 2013, Article ID 526512, pp. 1-8, 2013 (no month).*
Translation of JP 60-110774, Jun. 17, 1985.*
Translation of JP 61-155482, Jul. 15, 1986.*
JPO decision of refusal dated Feb. 4, 2019 re JP Patent Application No. 2016-554028.
International Search Report for PCT/JP2015/076942 dated Dec. 22, 2015; English translation submitted herewith (5 pages).
EPO Search Report (extended), issued re EPO Appln. 15851025.5, dated Mar. 6, 2018.
Office Action issued by SIPO (PRC) dated Sep. 30, 2018 in CN20158005611831.

(Continued)

*Primary Examiner* — C Melissa Koslow

(74) *Attorney, Agent, or Firm* — Fitch, Even, Tabin & Flannery LLP

(57) ABSTRACT

There is provided a one-pack type room-temperature-curable 2-cyanoacrylate based composition having magnetism. The 2-cyanoacrylate based composition having magnetism is characterized by containing (a) a 2-cyanoacrylic acid ester and (b) a magnetic powder dispersible in the 2-cyanoacrylic acid ester, wherein the content of the magnetic powder (b) is 5 to 500 parts by weight relative to 100 parts by weight of the 2-cyanoacrylic acid ester (a). The magnetic powder (b) is preferably a stainless steel.

16 Claims, No Drawings

(56) References Cited

OTHER PUBLICATIONS

EPO Communication dated Oct. 22, 2018 issued in EP Application No. 15 851 025.5.

Zhao et al., Development of the powder reaction moulding process, Journal of Chemical Technology and Biotechnology, 84(3):454-460 (2009).

Birkinshaw et al., Reaction molding of metal and ceramic powders, Journal of Chemical Technology & Biotechnology, 66(1):19-24 (1996).

JFE Techno-Research Corp., 2011 Nanomaterials Safety Measures Survey Business Report, translation of pp. 33-34, Mar. 2012.

Office Action (2nd), dated Jun. 18, 2019, with translation, re CN 201580056183.1.

ROC (Taiwan) Office Action, dated May 13, 2019, re TW Patent Application No. 104132738.

\* cited by examiner

2-CYANOACRYLATE COMPOSITION HAVING MAGNETISM

CROSS-REFERENCE TO RELATED APPLICATIONS

This application is a U.S. national phase application filed under 35 U.S.C. § 371 of International Application No. PCT/JP2015/076942, filed Sep. 24, 2015, designating the United States, which claims priority from Japanese Patent Application No. 2014-210656, filed Oct. 15, 2014, and the complete disclosures of which applications are hereby incorporated herein by reference in their entirety for all purposes.

TECHNICAL FIELD

The present invention relates to a 2-cyanoacrylate based composition containing a 2-cyanoacrylic acid ester and a magnetic powder.

BACKGROUND ART

2-Cyanoacrylate based compositions containing a 2-cyanoacrylic acid ester can initiate polymerization due to their anionic polymerizability by slight anion such as scanty moisture adhering to adherend surfaces, and can firmly join various materials in a short time. Hence, they are used as so-called instantaneous adhesives in broad fields such as industrial, medical and household fields. Although various components such as stabilizers, curing accelerators, thickeners and plasticizers have conventionally been blended with 2-cyanoacrylate based compositions in order impart required performance, the components that can be blended therewith are limited due to the above anionic polymerizability. Hence, in order to provide a joining portion with magnetism, it was necessary to previously fill the joining portion with magnetic powder and then coating the portion with a 2-cyanoacrylate based composition so as to fix adherends to each other, as described, for example, in Patent Literature 1.

On the other hand, as adhesive compositions having magnetism, various adhesive compositions have been conventionally proposed and used for the purposes of, for example, imparting magnetism to joining portions of electronic components and the like. For example, Patent Literature 2 discloses a ferromagnetic adhesive comprising an epoxy resin to which ferromagnetic powders such as Fe and Fe—Si are blended. Further, Patent Literature 3 discloses an adhesive composition which comprises two-part acrylic adhesives one part of which contains ferromagnetic powder such as iron powder. Further, Patent Literature 4 discloses a magnetic adhesive composed of at least one of a thermosetting silicone resin, an epoxy resin, a moisture-curable resin, an acrylic resin and an ultraviolet-curable resin, and a Mn—Zn ferrite magnetic powder.

CITATION LIST

Patent Literature

Patent Literature 1: Japanese Patent Publication (Laid-open) No. S58-215476
Patent Literature 2: Japanese Patent Publication (Laid-open) No. H1-289883
Patent Literature 3: Japanese Patent Publication (Laid-open) No. S59-91165
Patent Literature 4: Japanese Patent Publication (Laid-open) No. H8-120234

SUMMARY OF INVENTION

Problem to be Solved by the Invention

However, the fixation method of Patent Literature 1 is problematic in that the magnetic powder and the 2-cyanoacrylate based composition need to be applied one by one, thereby making workability poor, and the magnetic powder cannot be filled into wall surfaces and the like. The epoxy resin, the acrylic resin and the like disclosed in Patent Literatures 2 to 4 require mixing operation due to the two-pack curable type. Further, the thermosetting silicone resin and the ultraviolet-curable resin disclosed in Patent Literature 4 require a heating apparatus or an ultraviolet irradiation apparatus. Patent Literature 4 refers to a moisture-curable resin, but discloses nothing about magnetic powders suitable for 2-cyanoacrylate based compositions.

The present invention has been achieved in light of the above conventional situations, and aims at providing a one-pack type room-temperature-curable 2-cyanoacrylate based composition having magnetism.

Means for Solving the Problem

The present inventors have found that by blending a specific magnetic powder with a 2-cyanoacrylic acid ester, a 2-cyanoacrylate based composition good in storage stability can be obtained, thereby leading to the completion of the present invention.

That is, the present invention, according to its one aspect, provides a 2-cyanoacrylate based composition having magnetism, comprising (a) a 2-cyanoacrylic acid ester and (b) a magnetic powder dispersible in the 2-cyanoacrylic acid ester, the content of the magnetic powder (b) being 5 to 500 parts by weight relative to 100 parts by weight of the 2-cyanoacrylic acid ester (a).

According to a preferred embodiment of the present invention, the magnetic powder (b) is a stainless steel.

According to another preferred embodiment of the present invention, the stainless steel is at least one selected from the group consisting of martensitic stainless steel, ferritic stainless steel, austenite-ferrite two-phase stainless steel and precipitation hardening stainless steel.

According to yet another preferred embodiment of the present invention, the stainless steel has a volume basis median diameter of 1 to 200 μm.

According to still another preferred embodiment of the present invention, the 2-cyanoacrylate based composition having magnetism further comprises a fumed silica, the content of the fumed silica being 1 to 30 parts by weight relative to 100 parts by weight of the 2-cyanoacrylic acid ester (a).

Effect of the Invention

The 2-cyanoacrylate based composition of the present invention comprises a 2-cyanoacrylic acid ester and a specific magnetic powder, and thus is good in stability during production and storage stability. Further, in the case where the magnetic powder is a specific stainless steel, there can be made a 2-cyanoacrylate based composition better in stability during production and storage stability. In the case where the 2-cyanoacrylate based composition further comprises a fumed silica, sedimentation of the magnetic powder can be prevented. By using this 2-cyanoacrylate based composition having magnetism, magnetic portions can be formed very simply on various adherends.

DESCRIPTION OF EMBODIMENTS

Hereinafter, the 2-cyanoacrylate based composition of the present invention will be described in detail. The 2-cyanoacrylate based composition of the present invention comprises (a) a 2-cyanoacrylic acid ester and (b) a magnetic powder dispersible in the 2-cyanoacrylic acid ester, wherein the content of the magnetic powder (b) is 5 to 500 parts by weight relative to 100 parts by weight of the 2-cyanoacrylic acid ester (a).

As the "2-cyanoacrylic acid ester (a)", can be used 2-cyanoacrylic acid esters that are commonly used for 2-cyanoacrylate based compositions of this type without any particular limitation. Examples of the 2-cyanoacrylic acid esters include methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. These 2-cyanoacrylic acid esters can be used alone or in combination of two or more. Furthermore, among these 2-cyanoacrylic acid esters, 2-cyanoacrylic acid esters having an alkyl group with 3 or less carbon atoms are preferable since they are excellent in curability, and more preferable are ethyl 2-cyanoacrylate, n-propyl 2-cyanoacrylate or i-propyl 2-cyanoacrylate.

The "magnetic powder (b)" is not especially limited as long it is a magnetic powder that is dispersible in the 2-cyanoacrylic acid ester. Here, the sentence "dispersible in the 2-cyanoacrylic acid ester" means that a 2-cyanoacrylate based composition comprising a 2-cyanoacrylic acid ester to which a magnetic powder is added has fluidity for 12 hours at room temperature (15 to 30° C.). Examples of the magnetic powder include fine powders of metals and alloys other than iron powder, metal oxides typified by ferrite, and the like. Among these, from the point of dispersibility in a 2-cyanoacrylic acid ester, stainless steel is preferable. Further, more preferable is at least one selected from the group consisting of martensitic stainless steel, ferritic stainless steel, austenite-ferrite two-phase stainless steel and precipitation hardening stainless steel, since they have ferromagnetism. An austenitic stainless steel which does not fall under the above-mentioned stainless steels may be used if it is subjected to repeated quenching so as to transform its texture to martensite and acquire magnetism.

The stainless steel is an alloy steel containing iron as a main component together with chromium, nickel, manganese, sulfur and the like wherein it is preferable that the sulfur content of the stainless steel is 0.03% by weight or lower, and the nickel content thereof is 0.6% by weight or lower. It is also preferable that the manganese content is 0.5% by weight or lower. Sulfur, nickel and manganese in the stainless steel are elements promoting the polymerization of the 2-cyanoacrylic acid ester, and thus it is preferable that their amounts are as low as possible. When the contents of sulfur, nickel and manganese in the stainless steel are within the above ranges, the dispersibility of the stainless steel upon addition to the 2-cyanoacrylic acid ester and the storage stability of the 2-cyanoacrylate based composition are improved.

The particle diameter of the magnetic powder can be determined by a laser diffraction particle size analyzer, and can be represented by a median value which is measured in a dispersed state in deionized water and analyzed on volume basis. When the magnetic powder in use has a particle diameter that is too small, the dispersibility in the 2-cyanoacrylic acid ester becomes poor and the viscosity of the composition becomes too high, thereby making workability worse in some cases. Further, when the particle diameter is too large, the magnetic powder easily sediments in the composition, and thus the median diameter is preferably 1 to 200 µm, more preferably 10 to 150 µm, still more preferably 20 to 100 µm, and especially preferably 55 to 75 µm. When the median diameter of the magnetic powder is in the range of 55 to 75 µm, cured products exhibit stronger magnetism.

The content of the magnetic powder in the 2-cyanoacrylate based composition is 5 to 500 parts by weight when the 2-cyanoacrylic acid ester is assumed to be 100 parts by weight. The content of the magnetic powder is preferably 7 to 450 parts by weight, and more preferably 10 to 420 parts by weight. When the content of the magnetic powder is lower than 5 parts by weight, cured portions cannot be provided with a sufficient magnetism. Further, when the content of the magnetic powder is higher than 500 parts by weight, it is likely that the fluidity of the 2-cyanoacrylate based composition becomes poor and the workability is deteriorated. Further, the storage stability of the composition worsens in some cases.

The 2-cyanoacrylate based composition may contain a fumed silica. The fumed silica refers to an ultrafine anhydrous silica (having a primary particle diameter of 500 nm or smaller, especially 1 to 200 nm). This anhydrous silica is an ultrafine anhydrous silica (having a primary particle diameter of 500 nm or smaller, especially 1 to 200 nm) which is produced by, for example, oxidizing silicon tetrachloride as a raw material in gas phase under a high-temperature flame, and includes hydrophilic silica having high hydrophilicity and hydrophobic silica having high hydrophobicity. Both fumed silicas can be used, but hydrophobic silica is preferable since it is good in the dispersibility in the 2-cyanoacrylic acid ester.

As the hydrophilic silica, various commercially available products can be used; and examples thereof include AEROSIL 50, 130, 200, 300 and 380 (the foregoing are trade names, and manufactured by Nippon Aerosil Co., Ltd.). The specific surface areas of these hydrophilic silicas are 50±15 m²/g, 130±25 m²/g, 200±25 m²/g, 300±30 m²/g and 380±30 m²/g, respectively. Further, as commercially available hydrophilic silicas, there can be used REOLOSIL QS-10, QS-20, QS-30 and QS-40 (the foregoing are trade names, and manufactured by Tokuyama Corp.) and the like. The specific surface areas of these hydrophilic silicas are 140±20 m²/g, 220±20 m²/g, 300±30 m²/g and 380±30 m²/g, respectively. Additionally, commercially available hydrophilic silicas manufactured by Cabot Corp. or the like can also be used. It is preferable that the specific surface area of the hydrophilic silica is 20 to 600 m²/g.

Further, as the hydrophobic silica, there can be used products generated by subjecting hydrophilic silicas to surface treatment for hydrophobization. The surface treatment of the hydrophilic silica can be carried out, for example, by bringing a compound capable of reacting with hydroxy groups present on the surface of the hydrophilic silica to form a layer of hydrophobic groups on that surface, or a compound capable of being adsorbed by the surface of the hydrophilic silica to form a hydrophobic layer on that surface, into contact with the hydrophilic silica in the presence or absence of a solvent, preferably, with heating.

Examples of the compound used for hydrophobization of the hydrophilic silica by the surface treatment includes various types of alkyl-, aryl- and aralkyl-based silane coupling agents having hydrophobic groups such as n-octyltrialkoxysilane, silylating agents such as methyltrichlorosilane, dimethyldichlorosilane and hexamethyldisilazane, silicone oils such as polydimethylsiloxane, higher alcohols such as stearyl alcohol, and higher fatty acids such as stearic acid. The hydrophobic silicas may be products resulting from hydrophobization by use of any of these compounds.

Examples of commercially available hydrophobic silicas include AEROSIL RY200 and R202 which have been hydrophobized by surface treatment with a silicone oil, AEROSIL R974, R972 and R976 which have been hydrophobized by surface treatment with a dimethylsilylating agent, AEROSIL R805 which has been hydrophobized by surface treatment with n-octyltrimethoxysilane, and AEROSIL RX200 and R812 which have been hydrophobized by surface treatment with a trimethylsilylating agent (the foregoing are trade names and manufactured by Nippon Aerosil Co., Ltd.), and REOLOSIL MT-10 (trade name, manufactured by Tokuyama Corp.) which has been hydrophobized by surface treatment with methyltrichlorosilane. The specific surface areas of these hydrophobic silicas are $100\pm20$ $m^2/g$, $100\pm20$ $m^2/g$, $170\pm20$ $m^2/g$, $110\pm20$ $m^2/g$, $250\pm25$ $m^2/g$, $150\pm20$ $m^2/g$, $150\pm20$ $m^2/g$, $260\pm20$ $m^2/g$ and $120\pm10$ $m^2/g$, respectively. It is preferable that the specific surface area of the hydrophobic silica is 20 to 400 $m^2/g$.

A preferable content of the fumed silica in the 2-cyanoacrylate based composition is 1 to 30 parts by weight when the 2-cyanoacrylic acid ester is assumed to be 100 parts by weight. A more preferable content of the fumed silica is 1 to 25 parts by weight, and an especially preferable content thereof is 2 to 20 parts by weight, though depending on the kind of the 2-cyanoacrylic acid ester, the kind of the fumed silica, and the like. When the content of the fumed silica is 1 to 30 parts by weight, the 2-cyanoacrylate based composition can be prevented from the sedimentation of the magnetic powder and provided as a composition good in workability without impairing curability, adhesive strength and the like.

In addition to the aforementioned components, the 2-cyanoacrylate based composition of the present invention may contain anion polymerization accelerators, stabilizers, thickeners, plasticizers, colorants, fragrances, solvents, strength improvers and the like which are conventionally used for blending with compositions containing 2-cyanoacrylic acid esters, according to purposes and the like, in proper quantities within the ranges that do not impair curability, adhesion strength or the like of the composition.

Examples of the anionic polymerization accelerator include polyalkylene oxides, crown ethers, silacrown ethers, calixarenes, cyclodextrins and pyrogallol-based cyclic compounds. The polyalkylene oxides are polyalkylene oxides and derivatives thereof, and include, for example, those disclosed in Japanese Patent Publication (Kokoku) No. S60-37836, Japanese Patent Publication (Kokoku) No. H1-43790, Japanese Patent Publication (Laid-open) No. S63-128088, Japanese Patent Publication (Laid-open) No. H3-167279, U.S. Pat. Nos. 4,386,193, 4,424,327 and the like. Concrete examples thereof include (1) polyalkylene oxides such as diethylene glycol, triethylene glycol, polyethylene glycol and polypropylene glycol, and (2) derivatives of polalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers and dipropylene glycol dialkyl ethers. The crown ethers include, for example, those disclosed in Japanese Patent Publication (Kokoku) No. S55-2236, Japanese Patent Publication (Laid-open) No. H3-167279 and the like. Concrete examples thereof include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. The silacrown ethers include, for example, those disclosed in Japanese Patent Publication (Laid-open) No. S60-168775 and the like. Concrete examples thereof include dimethylsila-11-crown-4, dimethylsila-14-crown-5, and dimethylsila-17-crown-6. The calixarenes include, for example, those disclosed in Japanese Patent Publication (Laid-open) No. S60-179482, Japanese Patent Publication (Laid-open) No. S62-235379, Japanese Patent Publication (Laid-open) No. S63-88152 and the like. Concrete examples thereof include 5,11,17,23,29,35-hexa-tert-butyl-37,38,39,40,41,42-hexahydroxycalix[6]arene, 37,38,39,40,41,42-hexahydroxycalix[6]arene, 37,38,39,40, 41,42-hexa-(2-oxo-2-ethoxy)-ethoxycalix[6]arene, and 25,26,27,28-tetra-(2-oxo-2-ethoxy)-ethoxycalix[4]arene.

The cyclodextrins include, for example, those disclosed in Japanese Patent Publication (Kohyo) No. H5-505835. Concrete examples thereof include α-, β- or γ-cyclodextrin. The pyrogallol-based cyclic compounds include those disclosed in Japanese Patent Publication (Laid-open) No. 2000-191600 and the like. Concrete examples thereof include 3,4,5,10,11,12,17,18,19,24,25,26-dodecaethoxycarbomethoxy-C-1, C-8,C-15,C-22-tetramethyl[14]-metacyclophan. These anionic polymerization accelerators may be used alone or in combination of two or more.

Further, the stabilizers include (1) anion polymerization inhibitors, such as sulfur dioxide, aliphatic sulfonic acids such as methanesulfonic acid, aromatic sulfonic acids such as p-toluenesulfonic acid, boron trifluoride diethyl ether, $HBF_4$ and trialkyl borate, and (2) radical polymerization inhibitors such as hydroquinone, hydroquinone monomethyl ether, t-butyl catechol, catechol and pyrogallol. These stabilizers may be used alone or in combination of two or more.

The thickeners include polymethyl methacrylate, acrylic rubber, polyvinyl chloride, polystyrene, cellulose esters, polyalkyl-2-cyanoacrylates, and ethylene-vinyl acetate copolymers. These thickeners may be used alone or in combination of two or more.

The plasticizers include triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexyl-cyclohexyl carboxylate, diisobutyl fumarate, diisobutyl maleate, caproic triglyceride, 2-ethylhexyl benzoate, and dipropylene glycol dibenzoate. Among them, preferred from the viewpoint of good compatibility with 2-cyanoacrylic acid ester and high plasticizing efficiency are tributyl acetyl citrate, dimethyl adipate, dimethyl phthalate, 2-ethylhexyl benzoate and dipropylene glycol dibenzoate. These plasticizers may be used alone or in combination of two or more. The content of the plasticizer is not especially limited, but is preferably 3 to 120 parts by weight, and more preferably 10 to 100 parts by weight when the 2-cyanoacrylic acid ester is assumed to be 100 parts by weight. When the content of the plasticizer is 3 to 120 parts by weight, suitable flexibility can be imparted to cured products of the 2-cyanoacrylate based composition.

The 2-cyanoacrylate based composition of the present invention can be produced by mixing the 2-cyanoacrylic acid ester and the magnetic powder, and the above components as required, according to a known method. When the 2-cyanoacrylate based composition is produced and thereafter stored, the magnetic powder sometimes sediments depending on formulation, but in such case, the composition, if being again mixed, can be used.

EXAMPLES

Hereinafter, the present invention will be described in more detail by way of Examples, but the present invention is not limited to these Examples; and various modifications or changes may be made to the present invention without departing from the gist of the present invention. Here, parts and % are on weight basis unless otherwise specified.

1. Evaluation Methods (1) Median Diameter (d50) of Magnetic Powder

Measurement was carried out using a laser diffraction particle size analyzer, and the result was analyzed on volume basis. The measurement of the particle diameter d50 of the magnetic powder was carried out by first dispersing the magnetic powder in deionized water, treating the dispersion ultrasonically at 70 W for 2 min or longer, and thereafter carrying out the measurement using the laser diffraction particle size analyzer, and analyzing the result on volume basis.

(2) Stability of Composition

The 2-cyanoacrylic acid ester and the magnetic powder were mixed together, and then stability upon production of the composition was evaluated. Further, 20 g of the composition was charged in a polyethylene container, and stored under a 23° C. and 50% RH environment, and then fluidity (storage stability) of the liquid was evaluated. The evaluation result indicates the number of days during which fluidity was maintained.

(3) Sedimentation of Magnetic Powder

The 2-cyanoacrylic acid ester and the magnetic powder were mixed together, and then sedimentation of the magnetic powder was visually observed. Further, 20 g of the composition was charged in a polyethylene container, and stored under a 23° C. and 50% RH environment, and then separation of the liquid and the magnetic powder was evaluated. The evaluation result indicates a time during which no separation was visually observed.

(4) Magnetism 100 mg of the 2-cyanoacrylate based composition was coated onto an ABS (acrylonitrile-butadiene-styrene) resin plate (50 mm in length×25 mm in width×3 mm in thickness), and cured at room temperature (15 to 30° C.) When a neodymium magnet (10 mm in diameter×10 mm in thickness) was brought close to the cured body, it was observed whether the former sticks to the latter. ○ indicates that the sticking occurred; and × indicates that no sticking occurred.

2. Production Method of the 2-Cyanoacrylate Based Composition

Example 1

After blending 40 ppm of sulfur dioxide and 1,000 ppm of hydroquinone with ethyl 2-cyanoacrylate (provided that ethyl 2-cyanoacrylate was 100 parts by weight), 100 parts by weight of a ferritic stainless steel ("SUS410L", manufactured by Daido Steel Co., Ltd., median diameter: 61 μm, Cr: 12.57% by weight, Ni: 0.10% by weight, Mn: 0.14% by weight, S: 0.003% by weight) was blended therein, and stirred and mixed at room temperature (15 to 30° C.) for 1 min to thereby produce a composition. Then, the stability upon production, the storage stability and the magnetism were evaluated. The results are as shown in Table 1.

Example 2

After blending 40 ppm of sulfur dioxide and 1,000 ppm of hydroquinone with ethyl 2-cyanoacrylate (provided that ethyl 2-cyanoacrylate was 100 parts by weight), 10 parts by weight of a thickener (polymethyl methacrylate, molecular weight: 300,000) was dissolved therein. To this liquid, 11 parts by weight of the same ferritic stainless steel as in Example 1 was added, and stirred and mixed at room temperature (15 to 30° C.) for 1 min to thereby produce a composition. Then, the stability upon production, the storage stability and the magnetism were evaluated. The results are as shown in Table 1.

Examples 3 to 5 and Comparative Examples 1 to 3

2-Cyanoacrylate based compositions were produced and evaluated in the same manner as in Example 1, except that their compositions were changed as indicated in Tables 1 to 3. Magnetic powders that were used therein were as follows, and the results are shown in Tables 1 to 3.

SUS430: manufactured by Daido Steel Co., Ltd., a ferritic stainless steel, median diameter: 61 μm (Cr: 16.15% by weight, Ni: 0.12% by weight, Mn: 0.16% by weight, S: 0.003% by weight)

Iron powder: "TK-H", manufactured by JFE Steel Corp., median diameter: 65 μm

Alloy powder: "JEMK-S", manufactured by Kinsei Matec Co., Ltd., average particle diameter: 25 μm (catalog value)

Iron(II)diiron(III) oxide: median diameter: 76 μm

Example 6

After blending 40 ppm of sulfur dioxide and 1,000 ppm of hydroquinone with ethyl 2-cyanoacrylate (provided that ethyl 2-cyanoacrylate was 100 parts by weight), 5 parts by weight of a fumed silica ("AEROSIL RX200" (trade name), manufactured by Nippon Aerosil Co., Ltd.) was dispersed therein by a disperser. To this liquid, 100 parts by weight of the same ferritic stainless steel as in Example 1 was blended, and stirred and mixed at room temperature (15 to 30° C.) for 1 min to thereby produce a composition. Then, the stability upon production, the storage stability and the magnetism were evaluated. The results are as shown in Table 2.

Examples 7 to 9

2-Cyanoacrylate based compositions were produced and evaluated in the same manner as in Example 6, except that their compositions were changed as indicated in Table 2. The results are as shown in Table 2.

TABLE 1

|  |  | Example | | | | |
|---|---|---|---|---|---|---|
|  |  | 1 | 2 | 3 | 4 | 5 |
| Composition (parts) | ethyl 2-cyanoacrylate | 100 | 100 |  | 100 |  |
|  | isopropyl 2-cyanoacrylate |  |  |  |  | 100 |
|  | ethoxyethyl 2-cyanoacrylate |  |  | 100 |  |  |
|  | Thickener AEROSIL RX200 |  | 10 |  |  |  |
|  | AEROSIL R202 |  |  |  |  |  |
|  | SUS410L | 100 | 11 | 400 |  |  |
|  | SUS430 |  |  |  | 100 | 100 |
| Evaluation Results | Stability upon production | good | good | good | good | good |
|  | Storage stability (days) | >10 | >10 | >10 | >10 | >10 |
|  | Sedimentation of magnetic substance (hours) | <0.5 | <0.5 | <0.5 | <0.5 | <0.5 |
|  | Magnetism | ○ | ○ | ○ | ○ | ○ |

TABLE 2

|  |  | Example | | | |
|---|---|---|---|---|---|
|  |  | 6 | 7 | 8 | 9 |
| Composition (parts) | ethyl 2-cyanoacrylate | 100 |  | 100 |  |
|  | isopropyl 2-cyanoacrylate |  | 100 |  |  |
|  | ethoxyethyl 2-cyanoacrylate |  |  |  | 100 |
|  | Thickener |  |  | 3 |  |
|  | AEROSIL RX200 | 5 |  |  | 5 |
|  | AEROSIL R202 |  | 5 |  | 5 |
|  | SUS410L | 100 |  | 200 |  |
|  | SUS430 |  | 100 |  | 200 |
| Evaluation Results | Stability upon production | good | good | good | good |
|  | Storage stability (days) | >10 | >10 | >10 | >10 |
|  | Sedimentation of magnetic substance (hours) | >3 | >3 | >3 | >3 |
|  | Magnetism | ○ | ○ | ○ | ○ |

TABLE 3

|  |  | Comparative Example | | |
|---|---|---|---|---|
|  |  | 1 | 2 | 3 |
| Composition (parts) | ethyl 2-cyanoacrylate | 100 |  |  |
|  | isopropyl 2-cyanoacrylate |  | 100 |  |
|  | ethoxyethyl 2-cyanoacrylate |  |  | 100 |
|  | iron powder | 100 |  |  |
|  | iron alloy powder |  | 100 |  |
|  | iron (II) diiron(III) oxide |  |  | 100 |
| Evaluation Results | Stability upon production | solidified | solidified | solidified |

According to the results of Tables 1 and 2, when a 2-cyanoacrylate based composition contained a magnetic powder dispersible in a 2-cyanoacrylic acid ester (Examples 1 to 9), the composition was rendered to be good in the storage stability. It was also confirmed that cured products of the obtained 2-cyanoacrylate based compositions had magnetism. By contrast, in Comparative Examples 1 to 3 as shown in Table 3, 2-cyanoacrylate based compositions were solidified when it was produced, and were not usable.

INDUSTRIAL APPLICABILITY

The 2-cyanoacrylate based composition of the present invention is a one-pack type room-temperature-curable composition, and can easily form portions having magnetism on various adherends. Hence, the composition can be utilized in a broad range of products and technical fields in various industries.

The invention claimed is:
1. A 2-cyanoacrylate based composition having magnetism, comprising
   (a) a 2-cyanoacrylic acid ester; and
   (b) a magnetic powder dispersible in the 2-cyanoacrylic acid ester,
   wherein the content of the magnetic powder (b) is 5 to 500 parts by weight relative to 100 parts by weight of the 2-cyanoacrylic acid ester (a),
   wherein the magnetic powder is a stainless steel, wherein the stainless steel has a volume basis median diameter of 1 to 200 μm, and wherein the stainless steel is at least one selected from the group consisting of martensitic stainless steel, ferritic stainless steel, austenite-ferrite two-phase stainless steel and precipitation hardening stainless steel; and
   wherein the composition further comprises a fumed silica.
2. The 2-cyanoacrylate based composition having magnetism according to claim 1, wherein the 2-cyanoacrylate based composition contains 1 to 30 parts by weight of the fumed silica relative to 100 parts by weight of the 2-cyanoacrylic acid ester (a).
3. The 2-cyanoacrylate based composition having magnetism according to claim 1, wherein the stainless steel has a volume basis median diameter of 10 to 150 μm.
4. The 2-cyanoacrylate based composition having magnetism according to claim 1, wherein the stainless steel has a volume basis median diameter of 20 to 100 μm.
5. The 2-cyanoacrylate based composition having magnetism according to claim 1, wherein the stainless steel has a volume basis median diameter of 55 to 75 μm.
6. The 2-cyanoacrylate based composition having magnetism according to claim 1, wherein the content of the magnetic powder (b) is 7 to 450 parts by weight relative to 100 parts by weight of the 2-cyanoacrylic acid ester (a).

7. The 2-cyanoacrylate based composition having magnetism according to claim 1, wherein the content of the magnetic powder (b) is 10 to 420 parts by weight relative to 100 parts by weight of the 2-cyanoacrylic acid ester (a).

8. The 2-cyanoacrylate based composition having magnetism according to claim 1, wherein the fumed silica is a hydrophilic silica having a surface area of 20 to 600 $m^2/g$.

9. The 2-cyanoacrylate based composition having magnetism according to claim 1, wherein the fumed silica is a hydrophilic silica having a surface area selected from the group consisting of 50±15 $m^2/g$, 130±25 $m^2/g$, 140±20 $m^2/g$, 200±25 $m^2/g$, 220±20 $m^2/g$, 300±30 $m^2/g$, and 380±30 $m^2/g$.

10. The 2-cyanoacrylate based composition having magnetism according to claim 1, wherein the fumed silica is a hydrophobic silica having a surface area of 20 to 400 $m^2/g$.

11. The 2-cyanoacrylate based composition having magnetism according to claim 1, wherein the fumed silica is a hydrophobic silica having a surface area selected from the group consisting of 100±20 $m^2/g$, 110±20 $m^2/g$, 120±10 $m^2/g$, 150±20 $m^2/g$, 170±20 $m^2/g$, 250±25 $m^2/g$, and 260±25 $m^2/g$.

12. The 2-cyanoacrylate based composition having magnetism according to claim 1, wherein the 2-cyanoacrylate based composition contains 1 to 25 parts by weight of the fumed silica per 100 parts by weight of 2-cyanoacrylic acid ester a).

13. The 2-cyanoacrylate based composition having magnetism according to claim 1, wherein the 2-cyanoacrylate based composition contains 2 to 20 parts by weight of the fumed silica per 100 parts by weight of 2-cyanoacrylic acid ester (a).

14. A 2-cyanoacrylate based composition having magnetism, comprising
(a) a 2-cyanoacrylic acid ester;
(b) a magnetic powder dispersible in the 2-cyanoacrylic acid ester,
wherein the content of the magnetic powder (b) is 5 to 500 parts by weight relative to 100 parts by weight of the 2-cyanoacrylic acid ester (a),
wherein the magnetic powder is a stainless steel, wherein the stainless steel has a volume basis median diameter of 1 to 200 μm, and the stainless steel is at least one selected from the group consisting of martensitic stainless steel, ferritic stainless steel, austenite-ferrite two-phase stainless steel and precipitation hardening stainless steel; and
wherein the composition further comprises a fumed silica having a primary particle diameter of 500 nm or less.

15. The 2-cyanoacrylate based composition having magnetism according to claim 14, wherein the stainless steel has a volume basis median diameter of 61 to 200 μm.

16. The 2-cyanoacrylate based composition having magnetism according to claim 15, wherein the 2-cyanoacrylate based composition contains 1 to 30 parts by weight of the fumed silica relative to 100 parts by weight of the 2-cyanoacrylic acid ester (a).

* * * * *